(12) United States Patent
Bentley

(10) Patent No.: US 7,588,057 B2
(45) Date of Patent: Sep. 15, 2009

(54) INSULATED HOSE ASSEMBLY AND METHOD OF MANUFACTURE

(75) Inventor: Rob Bentley, Windsor, CT (US)

(73) Assignee: Teleflex Fluid Systems, Inc., Sterling Heights, MI (US)

( * ) Notice: Subject to any disclaimer, the term of this patent is extended or adjusted under 35 U.S.C. 154(b) by 210 days.

(21) Appl. No.: 11/496,416

(22) Filed: Aug. 1, 2006

(65) Prior Publication Data
US 2008/0029178 A1 Feb. 7, 2008

(51) Int. Cl.
*F16L 11/00* (2006.01)
(52) U.S. Cl. .................. 138/127; 138/149; 138/137; 138/141; 138/140
(58) Field of Classification Search .......... 138/149, 138/127, 137, 139, 124, 125, 140, 143, 134, 138/138, 144, 141
See application file for complete search history.

(56) References Cited

U.S. PATENT DOCUMENTS

| | | | | |
|---|---|---|---|---|
| 2,047,778 | A * | 7/1936 | Hayden | 138/143 |
| 2,713,551 | A * | 7/1955 | Kennedy | 138/150 |
| 3,023,787 | A | 3/1962 | Phillips et al. | |
| 4,095,937 | A * | 6/1978 | Colburn et al. | 432/3 |
| 4,402,346 | A * | 9/1983 | Cheetham et al. | 138/129 |
| 4,488,577 | A * | 12/1984 | Shilad et al. | 138/127 |
| 4,942,903 | A * | 7/1990 | Jacobsen | 138/110 |
| 5,124,878 | A | 6/1992 | Martucci | |
| 5,142,782 | A * | 9/1992 | Martucci | 29/890.144 |
| 5,192,476 | A * | 3/1993 | Green | 264/127 |
| 5,613,524 | A * | 3/1997 | Martucci | 138/137 |
| 5,655,572 | A * | 8/1997 | Marena | 138/125 |
| 6,257,280 | B1 | 7/2001 | Marena | |
| RE37,775 | E | 7/2002 | Martucci | |
| 6,843,278 | B2 * | 1/2005 | Espinasse | 138/134 |
| 2004/0194838 | A1 * | 10/2004 | Glejbol et al. | 138/134 |

* cited by examiner

*Primary Examiner*—Patrick F Brinson
(74) *Attorney, Agent, or Firm*—Baker & Hostetler LLP

(57) ABSTRACT

A hose assembly includes a tubular inner core, a high-temperature thermal insulator disposed about the inner core and in substantially continuous contact therewith, a sealing layer substantially surrounding the thermal insulator, and an outer reinforcing layer. The insulator may be a refractory paper tape braided or helically wrapped about the inner core, and may be multiple layers thick. The sealing layer, which may be a polymeric fluorocarbon tape, substantially surrounds the thermal insulator and protects the thermal insulator from chemical degradation. The outer reinforcing and sealing layer may be integrated. Alternatively, the outer reinforcing layer may be applied about the sealing layer, for example via braiding. A coupling may be attached at one end of the hose assembly to connect the hose assembly to a fluid system.

22 Claims, 3 Drawing Sheets

INSULATED HOSE ASSEMBLY AND METHOD OF MANUFACTURE

FIELD OF THE INVENTION

The present invention relates generally to hose assemblies. More particularly, the present invention relates to a hose assembly for use in high-temperature environments.

BACKGROUND OF THE INVENTION

Fluid-conveying hose assemblies are ubiquitous in everyday life. Often, such assemblies convey caustic, corrosive, or volatile materials, such as fuel and fuel additives. In addition, such hose assemblies are often exposed to extreme operating temperatures and internal fluid pressures. Thus, it is desirable for such hose assemblies to be resistant to the chemical, environmental, and physical stresses to which they will be subjected.

Vehicle hose assemblies are particularly subject to extreme operating conditions. Fuel lines, for example, must be able to negotiate the tight tolerances, tortuous paths, and exacting dimensions of modern vehicles to carry fuel from the fuel tank to the engine. They must withstand both the pressure of the fuel therein and the high operating temperatures of the vehicle's engine compartment. In addition, the fuel line must be chemically resistant to the fuel, lest the assembly degrade and fail.

Regarding chemical resistance to fuel, it is known that polymeric fluorocarbon materials such as polytetrafluoroethylene (PTFE) possess the requisite resistance for most fuel hose applications. Regarding structural strength and flexibility (that is, the ability to contain fluid under pressure and conform to vehicle dimensions), it is also known to braid fibers, such as stainless steel or nylon, about the inner core of the hose assembly to improve the kink-resistance of the hose assembly, improve the bend radius of the hose assembly, add tensile strength to the hose assembly, and increase the hoop strength of the hose assembly. For example, U.S. Pat. No. 5,655,572 ("the '572 patent") and U.S. Pat. No. 6,257,280 ("the '280 patent"), both to Marena, disclose hose assemblies having a PTFE inner core, a first braided reinforcing layer with an interspersed organic polymeric material, and a braided outer liner. It is also known to improve flexibility through the use of a convoluted hose, such as disclosed in U.S. Pat. No. 3,023,787 to Phillips et al.

Given the volatility of fuel, temperature resistance is of high importance in a hose assembly installed as a fuel line. This is especially true in racing vehicles, which generally utilize more volatile fuels in an effort to improve engine performance and achieve higher speeds. In addition, in order to improve aerodynamics, racing vehicles are deliberately modified to impede the flow of air through the engine compartment by obstructing openings that would otherwise be present. These modifications force the vehicle closer to the road surface. The concomitant loss of convective cooling, however, substantially increases the temperature within the engine compartment.

Extant hose assemblies do provide some degree of thermal protection. For example, the '572 patent and the '280 patent utilize heat resistant glass fibers in the first reinforcing layer. The extremely high engine compartment temperatures in racing vehicles, however, can overcome the insulating properties of extant hose assemblies, thus vaporizing the fuel in the fuel lines, thereby potentially causing engine failure (vapor lock) and other undesirable conditions. It should be understood that this problem is not unique to fuel lines, but rather is faced by any volatile fluids present in the engine compartment, including, but not limited to, transmission fluid, brake fluid, and motor oil.

Accordingly, it is desirable to provide a hose assembly that is capable of preventing the fluid therein from vaporizing under the extremely high operating temperatures present in the engine compartment of a racing vehicle.

SUMMARY OF THE INVENTION

The foregoing needs are met, to a great extent, by the present invention, wherein in one aspect an apparatus is provided that in some embodiments provides a hose assembly usable in high-temperature environments without vaporizing the fluid conveyed therein.

In accordance with one embodiment of the present invention, a hose assembly includes a tubular inner core, a high-temperature thermal insulator disposed about the inner core and in substantially continuous contact therewith, a sealing layer substantially surrounding the thermal insulator, and an outer reinforcing layer. The inner core may be an extruded convoluted polymeric fluorocarbon tube, and may further include an integrated longitudinal electrical conductor. The insulator may be a refractory paper tape braided or helically wrapped about the inner core, and may be multiple layers thick. The sealing layer, which may be a polymeric fluorocarbon tape, substantially surrounds the thermal insulator and protects the thermal insulator from environmental contaminants such as spilled corrosive fluids. The outer reinforcing and sealing layer may be integrated. Alternatively, the outer reinforcing layer may be applied about the sealing layer. A coupling may be attached at one end of the hose assembly to connect the hose assembly to a fluid system.

In another aspect of the present invention, a method of manufacturing a hose assembly is provided. The method includes providing a tubular inner core, disposing a high-temperature thermal insulator about the inner core with an innermost layer of the thermal insulator in substantially continuous contact with the inner core, sealing the thermal insulator with a sealing layer substantially surrounding the thermal insulator, and reinforcing the hose assembly. A coupling may be attached to an end of the hose assembly in order to connect the hose assembly to a fluid system.

In accordance with yet another embodiment of the present invention, a high-temperature hose assembly includes means for conveying a fluid, means for insulating the conveying means, means for sealing the insulating means, and means for coupling the hose assembly to a fluid system. The insulating means serves to insulate the conveying means from temperatures sufficient to vaporize the fluid therein. That is, the insulating means keeps the fluid temperature below the point of vaporization notwithstanding high ambient temperatures. The sealing means seals the insulating means from environmental contaminants, such as spilled corrosive fluids.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
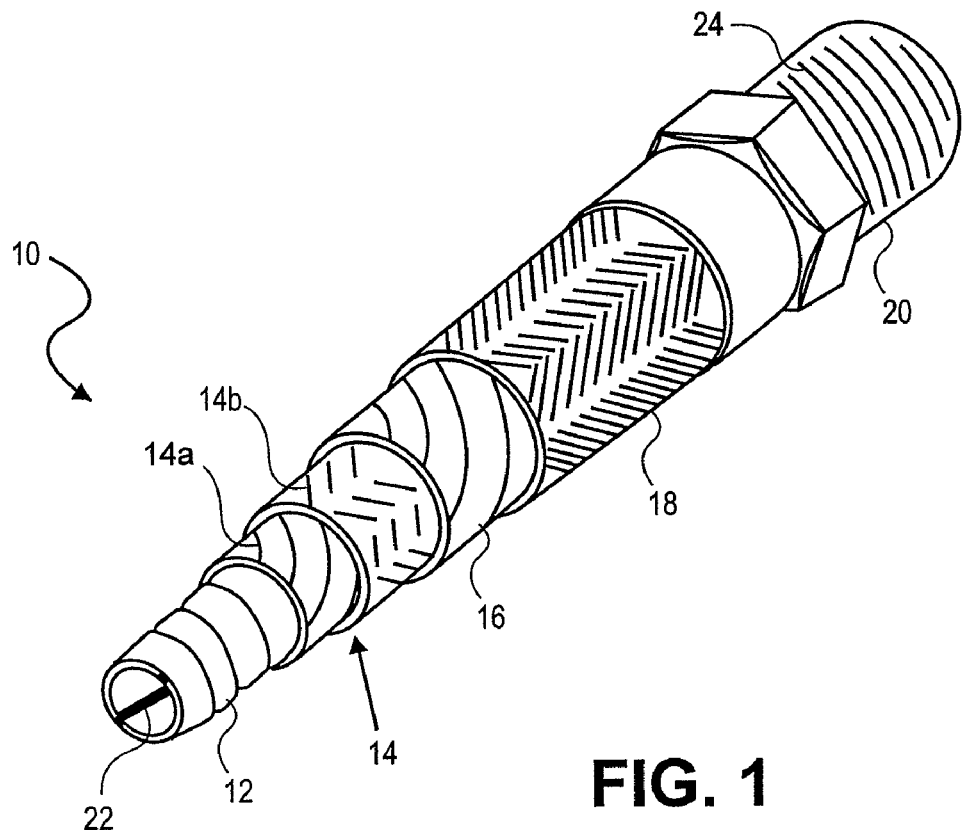
FIG. 1 is a partial cutaway perspective view of a hose assembly according to an embodiment of the present invention.

The invention will now be described with reference to the drawing figures, in which like reference numerals refer to like parts throughout. An embodiment in accordance with the present invention provides a hose assembly generally including a tubular inner core, a high-temperature thermal insulator disposed about the inner core and in substantially continuous contact therewith, a sealing layer substantially surrounding the thermal insulator, and an outer reinforcing layer. The inner core may further include an integrated longitudinal electrical conductor. In embodiments, the insulator is a refractory paper tape braided or helically wrapped about the inner core to achieve greater than 100% coverage of the inner core. The sealing layer substantially surrounds the thermal insulator and protects the thermal insulator from environmental contaminants. The outer reinforcing and sealing layer may be integrated. Alternatively, the outer reinforcing layer may be applied about the sealing layer. A coupling may be attached at one end of the hose assembly to connect the hose assembly to a fluid system. The resultant hose assembly is capable of maintaining a fluid flowing therein at a temperature below its boiling point even in the presence of extremely high ambient temperatures.

An embodiment of the present inventive apparatus is illustrated in FIG. 1. A hose assembly 10 generally includes a tubular inner core 12, a high-temperature thermal insulator 14 disposed about inner core 12, a sealing layer 16 substantially surrounding thermal insulator 14, and an outer reinforcing layer 18. A coupling 20 may be attached to one end of hose assembly 10 for the purpose of connecting hose assembly 10 into a fluid system, such as a vehicle fuel system.

Inner core 12 conveys a fluid therethrough. In some embodiments of the present invention, inner core 12 is formed of a polymeric fluorocarbon material resistant to both chemical and heat degradation. This permits a variety of fluids, including fuels and fuel additives, to pass through inner core 12 without corrosion or degradation thereof. Inner liner 12 may be made of any number of polymeric fluorocarbon materials, including, but not limited to, polytetrafluoroethylene (PTFE), perfluorinated ethylenepropylene (FEP), perfluoroalkoxy fluorocarbon resins (PFA), ethylene tetrafluroethylene (ETFE), polychlorotrifluroethylene, and polychlorotrifluoroethylene-ethylene. Other materials may be used to form inner core 12 without departing from the scope of the present invention.

Inner core 12 may be extruded using melt or paste extrusion techniques to a wall thickness between about 0.001 and about 0.120 inches. Such techniques provide a smooth-bore, free of undulations and seams that could cause turbulent flow within inner core 12. Turbulent flow can cause build-up of electrical charge within hose assembly 10, which is undesirable when potentially flammable fluids, such as fuels, are being transported therethrough. A convoluted inner core 12, however, may also be utilized without departing from the spirit and scope of the present invention, for example to improve the flexibility and curve radius of hose assembly 10. In addition, it is contemplated that inner core 12 may be formed through other processes, including, but not limited to, wrapping a polymeric fluorocarbon tape about a mandrel.

As noted above, electrical charges tend to accumulate along the length of inner core 12 as fluid flows through hose assembly 10. To alleviate this condition, inner core 12 may include an integrated, longitudinal electrical conductor 22. Conductor 22 may be a strip of carbon black along the length of inner core 12. Alternatively, conductor 22 may be interspersed throughout inner core 12, for example by intermixing carbon black throughout the polymeric fluorocarbon material while inner liner 12 is extruded. Other methods of providing conductor 22, including, but not limited to, providing a conductive liner within inner liner 12, are also contemplated and regarded as within the scope of the present invention.

Thermal insulator 14 is disposed about inner core 12 such that a first, or innermost, layer 14a of thermal insulator 14 is in substantially continuous contact with inner core 12. In some embodiments of the present invention, a second, outermost layer 14b of thermal insulator 14 is disposed about and in substantially continuous contact with innermost layer 14a, thereby providing 200% coverage of thermal insulator 14 over inner core 12. One skilled in the art will recognize that additional layers may also be used to increase the coverage of thermal insulator 14 without departing from the spirit and scope of the present invention.

In certain embodiments of hose assembly 10, thermal insulator 14 is applied to inner core 12 by helically wrapping thermal insulator thereabout, such as illustrated with respect to first layer 14a of thermal insulator 14. Other methods of applying thermal insulator 14 to inner core 12, including braiding thermal insulator 14 about inner core 12 (i.e., second layer 14b of thermal insulator 14), painting thermal insulator 14 onto inner core 12, and weaving thermal insulator 14 about inner core 12 may also be used. Alternatively, thermal insulator 14 may be pre-made and slipped on to inner core 12 in a sock-like fashion. One skilled in the art will recognize that the several layers of thermal insulator 14 may be discrete (i.e., made of multiple, independent pieces) or continuous (i.e., a length of tape wrapped repeatedly about inner core 12 until the desired level of coverage is achieved).

Thermal insulator 14 is a high-temperature thermal insulator. That is, thermal insulator 14 is capable of withstanding greater operating temperatures than extant devices without thermal breakdown, vaporization of the fluid transiting hose assembly 10, or other undesirable consequences, as will be discussed further below with respect to FIGS. 3 and 4. In some embodiments, thermal insulator 14 is a ceramic refractory paper tape, though it is contemplated that other materials with different thermal properties may also be used as thermal insulator 14 depending upon the particular application of hose assembly 10.

Sealing layer 16 substantially surrounds an outermost layer (i.e., layer 14b) of thermal insulator 14. As with thermal insulator 14, sealing layer 16 may be applied through a number of methods, including, but not limited to, braiding, helical wrapping, weaving, and slip-on. In certain embodiments of the invention, sealing layer 16 is applied by helical wrapping about thermal insulator 14.

Sealing layer 16 protects thermal insulator 14, which is not highly resistant to fluids, from chemical degradation due, for example, to spillage of corrosive fluids onto hose assembly 10. To this end, sealing layer 16 is, in certain embodiments of the invention, a polymeric fluorocarbon layer such as a PTFE tape wrapped about thermal insulator 14. To facilitate attachment of sealing layer 16 within hose assembly 10, the backside of the tape may contain an adhesive such that it will stick to both itself and thermal insulator 14. As described above, polymeric fluorocarbons are chemically inert, such that sealing layer 16 inhibits spilled fluids (i.e., oils, fuels, and other vehicle fluids) from contacting and dissolving thermal insulator 14. This, in turn, substantially prevents breakdown and failure of thermal insulator 14 in a chemically harsh environment such as a vehicle engine compartment, which, in turn, preserves the high temperature operability of hose assembly 10.

An outer reinforcing layer 18 increases the strength and flexibility of hose assembly 10. That is, reinforcing layer 18 allows hose assembly, in particular inner core 12, to be bent to small radii without kinking. Reinforcing layer 18 also adds to the burst strength of hose assembly 10, such that higher pressure fluids may be conveyed without rupturing hose assembly 10. In addition, reinforcing layer 18 facilitates the attachment of coupling 20 by increasing the tensile strength of hose assembly 10 such that coupling 20 may be fixedly attached thereto.

In some embodiments, reinforcing layer 18 is a discrete layer braided, or otherwise disposed, about sealing layer 16, though it is also contemplated that reinforcing layer 18 and sealing layer 16 may be integrated. For example, sealing layer 16 and reinforcing layer 18 may be integrated as one or more braided polymeric fluorocarbon layers serving both to seal thermal insulator 14 from external contaminants and to reinforce hose assembly 10. One skilled in the art will recognize that reinforcing layer 18 may be made of any suitable material depending upon the particular application of hose assembly 10 (i.e., a stainless steel reinforcing layer 18 in compliance with regulations requiring fuel hoses to be metal-jacketed).

Coupling 20 is adapted to engage the ends of hose assembly 10 in order to connect hose assembly 10 into a fluid system. Typically, coupling 20 is adapted by way of an insert portion that engages the inner surface of inner core 12. To this end, the insert portion may have a plurality of barbs. Coupling 20 may also include an engaging portion 24 extending longitudinally from the insert portion for engaging a hydraulic fitting. It should be recognized that engaging portion 24 may be any configuration that will cooperate with and complement the hydraulic fitting to which it will be connected, such as a male or female threaded member, a ball-and-socket joint, a compression fitting, or a quick-disconnect slip ring connection. Alternatively, instead of engaging portion 24, coupling 20 may include an additional insert portion adapted to engage the interior surface of inner liner 12 of a second hose assembly 10. Coupling 20 may be mechanically connected to hose assembly 10 or molded to hose assembly 10. Other methods of affixing coupling 20 to hose assembly 10 may also be used within the scope of the present invention.

Figure 2:
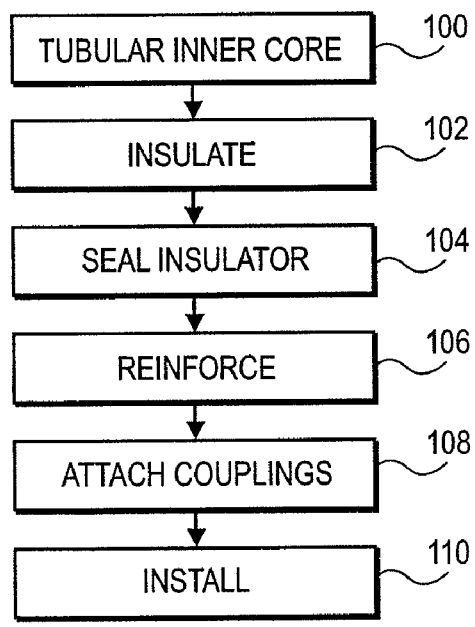
FIG. 2 is a flowchart illustrating steps that may be followed in manufacturing the hose assembly shown in FIG. 1.

FIG. 2 is a flowchart illustrating steps that may be followed in manufacturing hose assembly 10. In step 100, a tubular inner core is provided. For example, a tubular inner core may be melt- or paste-extruded from a polymeric fluorocarbon such as PTFE. As noted above, an integrated conductor may be added to the inner core.

The inner core is insulated to the desired degree in step 102. For example, a refractory tape may be helically wrapped about the inner core to achieve 200% (i.e., two-layer) coverage thereof. The innermost (i.e., first) layer of the thermal insulator is in substantially continuous contact with the inner core. Once insulated, the thermal insulator is sealed from environmental contaminants in step 104, such as by helically wrapping a PTFE tape to substantially surround the thermal insulator.

In step 106, the hose assembly is reinforced, for example by braiding a metallic reinforcing layer about the sealing layer. A braiding machine, such as a maypole braider or rotary braider, includes a plurality of spools carrying the braiding fibers. The fibers are fed through the machine to a braiding area. The hose assembly passes through the braiding area, where the fibers are wound about the sealing layer to form the reinforcing layer. Once reinforced, suitable couplings may be attached at either or both ends in step 108, and the resultant hose assembly connected to a fluid system in step 110.

Figure 3:
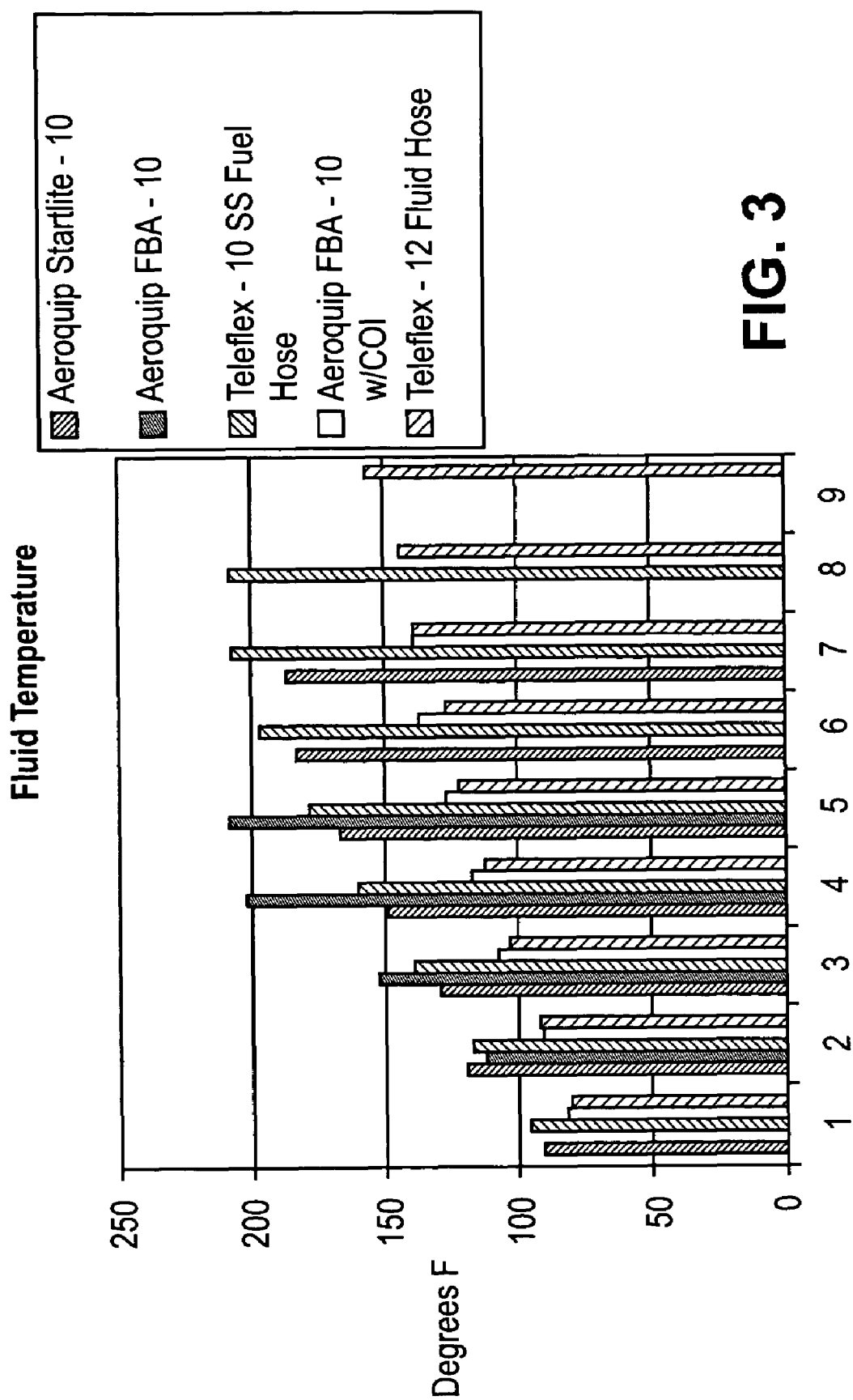
FIG. 3 is plot of fluid temperature over time in a variety of hose assemblies, including an embodiment of the present invention.
Figure 4:
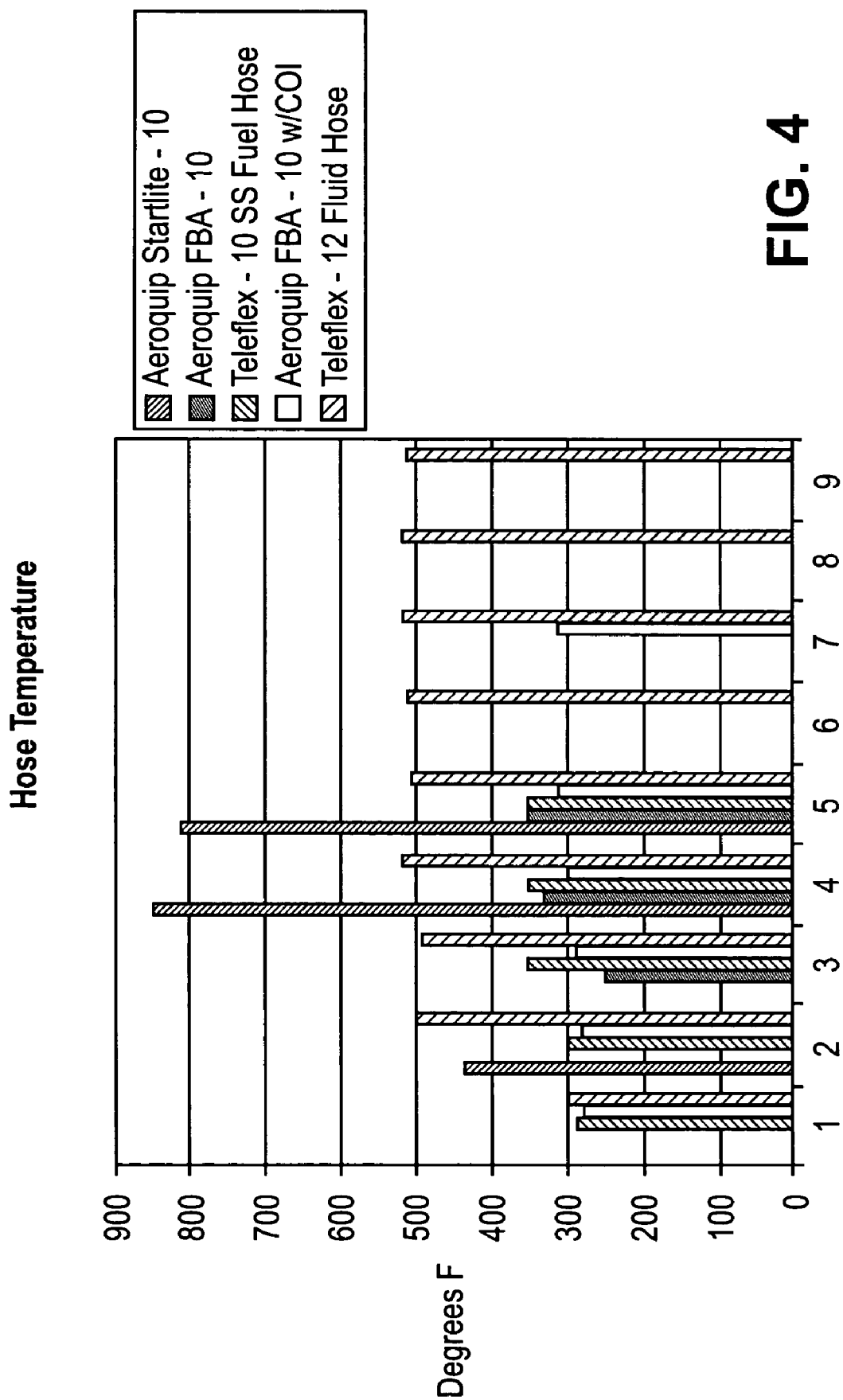
FIG. 4 is a plot of hose surface temperature over time for a variety of hose assemblies, including an embodiment according to the present invention.

As alluded to above, the hose assembly according to the present invention is capable of use in high-temperature environments without vaporization of the fluid being conveyed. FIGS. 3 and 4 illustrate the thermal performance of an embodiment of the present invention relative to extant hose assemblies. They show, respectively, plots of fluid temperature and hose surface temperature over time.

To derive FIGS. 3 and 4, a variety of hose assemblies, including a hose assembly 10 according to an embodiment of the present invention, were thermally tested. These hose assemblies were subjected to a 100° F. heat source placed two inches from the hose assembly. The fluid within the hose assembly was water at 72° F. and static pressure (that is, water at approximately room temperature and pressure). The temperature of the water and of the outer surface of the hose assembly was monitored at one minute intervals until the fluid vaporized. The resultant data is shown in Tables 1 and 2, below.

TABLE 1

| | Fluid Temperature (° F.) vs. Time (minutes) | | | | | | | | |
|---|---|---|---|---|---|---|---|---|---|
| | 1:00 | 2:00 | 3:00 | 4:00 | 5:00 | 6:00 | 7:00 | 8:00 | 9:00 |
| Aeroquip Starlite - 10 | 91 | 119 | 129 | 149 | 167 | 183 | 187 | | |
| Aeroquip FBA - 10 | | 112 | 152 | 201 | 208 | | | | |
| Aeroquip FBA - 10 w/COI | 82 | 90 | 107 | 117 | 127 | 137 | 139 | | |
| Teleflex - 10 SS Fuel Hose | 96 | 117 | 139 | 160 | 178 | 197 | 207 | 208 | |
| Teleflex - 12 Fluid Hose | 80 | 92 | 103 | 112 | 122 | 127 | 139 | 144 | 157 |

TABLE 2

Hose Surface Temperature (° F.) vs. Time (minutes)

|  | 1:00 | 2:00 | 3:00 | 4:00 | 5:00 | 6:00 | 7:00 | 8:00 | 9:00 |
|---|---|---|---|---|---|---|---|---|---|
| Aeroquip Starlite - 10 |  | 437 |  | 850 | 813 |  |  |  |  |
| Aeroquip FBA - 10 |  |  | 250 | 330 | 350 |  |  |  |  |
| Aeroquip FBA - 10 w/COI | 280 | 283 | 288 | 300 | 312 |  | 310 |  |  |
| Teleflex - 10 SS Fuel Hose | 288 | 300 | 350 | 350 | 350 |  |  |  |  |
| Teleflex - 12 Fluid Hose | 300 | 500 | 492 | 518 | 505 | 510 | 516 | 517 | 510 |

The data presented in Tables 1 and 2 and illustrated in FIGS. 3 and 4 demonstrate that, notwithstanding extremely high ambient temperatures, an embodiment of the present invention, shown in Tables 1 and 2 as Teleflex—12 Fluid Hose, best insulates the fluid from vaporization.

Although one example of outer reinforcing layer 18 has been described as a braided metallic layer, one skilled in the art will recognize that other reinforcing materials may be used without departing from the spirit and scope of the present invention. For example, it is clearly desirable to conserve weight in racing vehicles in an effort to improve racing performance. Thus, except where a metallic braid is mandated by rule or regulation (i.e., for fuel systems), a lightweight aramid fabric may be used in reinforcing layer 18 for hose assemblies 10 intended for installation in a racing vehicle. Further, although an example of hose assembly 10 is described primarily with reference to the fuel system of a racing vehicle, it can also be used for other racing vehicle fluid systems, fluid systems in non-racing vehicles, and in any high-temperature environment where it is desirable to thermally insulate the fluid being conveyed.

The many features and advantages of the invention are apparent from the detailed specification, and thus it is intended by the appended claims to cover all such features and advantages of the invention falling within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to within the scope of the invention.

What is claimed is:

1. A hose assembly, comprising:
   a tubular inner core configured with a substantially smooth inner wall so that a fluid being transmitted along the smooth inner wall of said tubular inner core flows substantially free of turbulence, wherein said tubular inner core is formed of a polymeric fluorocarbon material and further includes an integrated electrical conductor;
   a high-temperature thermal insulator disposed about said inner core, an innermost layer of said high-temperature thermal insulator in substantially continuous contact with said inner core;
   a sealing layer substantially surrounding an outermost layer of said high-temperature thermal insulator; and
   an outer reinforcing layer.

2. The hose assembly according to claim 1, wherein said outer reinforcing layer comprises a reinforcing layer disposed about said sealing layer.

3. The hose assembly according to claim 2, wherein said outer reinforcing layer comprises a metallic layer braided about said sealing layer.

4. The hose assembly according to claim 1, wherein said high-temperature thermal insulator comprises:
   a first layer of high-temperature thermal insulation disposed about said inner core in substantially continuous contact therewith; and
   a second layer of high-temperature thermal insulation disposed about said first layer of high-temperature thermal insulation in substantially continuous contact therewith, wherein said sealing layer substantially surrounds said second layer of high-temperature thermal insulation.

5. The hose assembly according to claim 1, wherein said high-temperature thermal insulator is helically wrapped about said inner core in substantially continuous contact therewith.

6. The hose assembly according to claim 1, wherein said high-temperature thermal insulator is braided about said inner core in substantially continuous contact therewith.

7. The hose assembly according to claim 1, wherein said high-temperature thermal insulator comprises a refractory paper disposed about said inner core in substantially continuous contact therewith.

8. The hose assembly according to claim 1, wherein said sealing layer comprises a polymeric fluorocarbon layer substantially surrounding said high-temperature thermal insulator.

9. The hose assembly according to claim 1, wherein said sealing layer is helically wrapped about said outermost layer of said high-temperature thermal insulator.

10. The hose assembly according to claim 1, wherein said inner core comprises a convoluted polymeric fluorocarbon tube.

11. The hose assembly according to claim 1, wherein said is a longitudinal electrical conductor.

12. The hose assembly according to claim 1, further comprising a coupling attached to one end of the hose assembly, said coupling connectable to a fluid system.

13. A method of manufacturing a hose assembly, the method comprising:
   providing a tubular inner core configured with a substantially smooth inner wall so that a fluid being transmitted along the smooth inner wall of said tubular inner core flows substantially free of turbulence, wherein said tubular inner core is formed of a polymeric fluorocarbon material and further includes an integrated electrical conductor;
   disposing a high-temperature thermal insulator about the inner core with an innermost layer of the high-temperature thermal insulator in substantially continuous contact with the inner core;
   sealing the high-temperature thermal insulator with a sealing layer substantially surrounding an outermost layer of the high-temperature thermal insulator; and
   reinforcing the hose assembly.

14. The method according to claim 13, wherein reinforcing the hose assembly comprises disposing a reinforcing layer about the sealing layer.

15. The method according to claim 13, wherein disposing a high-temperature thermal insulator about the inner core comprises helically wrapping the inner core with at least one layer of high-temperature thermal insulation, an innermost layer of the at least one layer of high-temperature thermal insulation being in substantially continuous contact with the inner core.

16. The method according to claim 13, wherein disposing a high-temperature thermal insulator about the inner core comprises braiding at least one layer of high-temperature thermal insulation about the inner core, an innermost layer of the at least one layer of high-temperature thermal insulation being in substantially continuous contact with the inner core.

17. The method according to claim 13, wherein sealing the high-temperature thermal insulator comprises substantially surrounding the high-temperature thermal insulator with a polymeric fluorocarbon.

18. The method according to claim 13, wherein providing a tubular inner core comprises extruding a polymeric fluorocarbon tube.

19. The method according to claim 13, further comprising:
attaching a coupling to one end of the hose assembly; and
connecting the coupling to a fluid system.

20. The hose assembly according to claim 1, wherein said sealing layer and said outer reinforcing layer are integrated.

21. The hose assembly according to claim 1, wherein said sealing layer and said outer reinforcing layer are braided together.

22. The hose assembly according to claim 1, wherein said integrated electrical conductor is intermixed throughout the polymeric fluorocarbon material of said inner core.

* * * * *